US009154002B2

(12) United States Patent
Norconk et al.

(10) Patent No.: US 9,154,002 B2
(45) Date of Patent: Oct. 6, 2015

(54) SYSTEMS AND METHODS FOR DETECTING DATA COMMUNICATION OVER A WIRELESS POWER LINK

(75) Inventors: Matthew J. Norconk, Grand Rapids, MI (US); Scott A. Mollema, Rockford, MI (US); David W. Baarman, Fennville, MI (US); Joshua K. Schwannecke, Grand Rapids, MI (US); Dale R. Liff, Kent, OH (US); Andrew C. Zeik, Hudson, OH (US); Mark A. Blaha, Twinsburg, OH (US); Robert D. Gruich, Copley, OH (US); Jason L. Amistadi, Lyndhurst, OH (US)

(73) Assignee: Access Business Group International LLC, Ada, MI (US)

( * ) Notice: Subject to any disclaimer, the term of this patent is extended or adjusted under 35 U.S.C. 154(b) by 1094 days.

(21) Appl. No.: 13/012,000

(22) Filed: Jan. 24, 2011

(65) Prior Publication Data

US 2011/0204711 A1 Aug. 25, 2011

Related U.S. Application Data (60) Provisional application No. 61/298,021, filed on Jan. 25, 2010.

(51) Int. Cl.
*H01F 27/42* (2006.01)
*H01F 37/00* (2006.01)
(Continued)

(52) U.S. Cl.
CPC ............... *H02J 17/00* (2013.01); *H02J 5/005* (2013.01); *H04B 5/0025* (2013.01); *H04B 5/0031* (2013.01); *H04B 5/0037* (2013.01); *H04B 5/0093* (2013.01)

(58) Field of Classification Search
CPC ........... H02J 5/005; H02J 7/025; H02J 17/00; H04B 5/00
USPC .......................................... 307/104; 320/108
See application file for complete search history.

(56) References Cited

U.S. PATENT DOCUMENTS

| 4,602,253 | A | 7/1986 | Kreft |
| 4,654,658 | A | 3/1987 | Walton |

(Continued)

FOREIGN PATENT DOCUMENTS

| EP | 0 533 247 | 3/1993 |
| JP | 09-103037 | 4/1997 |

(Continued)

OTHER PUBLICATIONS

System Description Wireless Power Transfer; vol. 1; Low Power; Part 1: Interface Definition; Version 1.0; Wireless Power Consortium; Jul. 2010.

(Continued)

*Primary Examiner* — Carlos Amaya
(74) *Attorney, Agent, or Firm* — Warner Norcross & Judd LLP (57) ABSTRACT

A wireless power supply system that detects communications in the input power to the switching circuit. In this aspect of the invention, the wireless power supply includes a detector for generating a signal indicative of the current in the input to the switching circuitry, a band-pass filter for filtering the detected signal, an amplifier for amplifying the filtered signal, a filter for filtering the amplified signal and a comparator for converting the final signal into a stream of high and low signals that can be passed to a controller for processing as binary data stream. In a second aspect, the wireless power supply system includes a detector for generating a signal that varies in dependence on changes in the phase relationship between the current and the voltage in the primary-side tank circuit, a band-pass filter for filtering the signal, an amplifier for amplifying the filtered signal, a filter for filtering the amplified signal and a comparator for converting the final signal into a stream of high and low signals that can be passed to a controller for processing as binary data stream.

14 Claims, 11 Drawing Sheets

(51) Int. Cl.
*H01F 38/00* (2006.01)
*H02J 17/00* (2006.01)
*H02J 5/00* (2006.01)
*H04B 5/00* (2006.01)

(56) References Cited

U.S. PATENT DOCUMENTS

| | | |
|---|---|---|
| 5,099,227 A | 3/1992 | Geiszler et al. |
| 5,105,190 A | 4/1992 | Kip et al. |
| 5,367,242 A | 11/1994 | Hulman |
| 5,455,466 A | 10/1995 | Parks et al. |
| 5,596,567 A | 1/1997 | deMuro et al. |
| 5,734,254 A | 3/1998 | Stephens |
| 5,896,278 A | 4/1999 | Tamura et al. |
| 5,963,012 A | 10/1999 | Garcia et al. |
| 6,057,668 A | 5/2000 | Chao |
| 6,080,983 A | 6/2000 | Waczynski et al. |
| 6,118,249 A | 9/2000 | Brockmann et al. |
| 6,184,651 B1 | 2/2001 | Fernandez et al. |
| 6,320,830 B1 | 11/2001 | Tsukamoto et al. |
| 6,329,808 B1 | 12/2001 | Enguent |
| 6,427,065 B1 | 7/2002 | Suga et al. |
| 6,469,472 B1 | 10/2002 | Aoshima et al. |
| 6,844,702 B2 | 1/2005 | Giannopoulos et al. |
| 6,912,137 B2 | 6/2005 | Berghegger |
| 7,076,206 B2 | 7/2006 | Elferich et al. |
| 7,366,466 B2 | 4/2008 | Forster et al. |
| 7,623,831 B2 | 11/2009 | Forster et al. |
| 7,697,892 B2 | 4/2010 | Komoriya |
| 7,915,858 B2 | 3/2011 | Liu et al. |
| 7,953,369 B2 | 5/2011 | Baarman |
| 8,004,235 B2 | 8/2011 | Baarman et al. |
| 8,060,011 B2 | 11/2011 | Jin |
| 8,090,550 B2 | 1/2012 | Azancot et al. |
| 8,194,583 B2 | 6/2012 | Zhu et al. |
| 2002/0154518 A1 | 10/2002 | Elferich et al. |
| 2003/0214821 A1 | 11/2003 | Giannopoulos et al. |
| 2004/0039423 A1 | 2/2004 | Dolgin |
| 2005/0068019 A1 | 3/2005 | Nakamura et al. |
| 2007/0042729 A1 | 2/2007 | Baaman et al. |
| 2007/0228833 A1 | 10/2007 | Stevens et al. |
| 2008/0200119 A1* | 8/2008 | Onishi et al. .................. 455/41.1 |
| 2009/0011706 A1 | 1/2009 | Wilson et al. |
| 2009/0101716 A1 | 4/2009 | Mani et al. |
| 2009/0133942 A1 | 5/2009 | Iisaka et al. |
| 2009/0239496 A1 | 9/2009 | Toncich et al. |
| 2009/0243394 A1 | 10/2009 | Levine |
| 2009/0261884 A1* | 10/2009 | Kim .............................. 327/333 |
| 2010/0142509 A1 | 6/2010 | Zhu et al. |
| 2010/0151808 A1 | 6/2010 | Toncich et al. |
| 2011/0050164 A1 | 3/2011 | Partovi et al. |
| 2011/0065398 A1 | 3/2011 | Liu et al. |
| 2011/0163608 A1* | 7/2011 | Brohlin et al. ................. 307/104 |
| 2011/0199045 A1 | 8/2011 | Hui et al. |
| 2012/0083205 A1 | 4/2012 | Marcu et al. |
| 2012/0104997 A1 | 5/2012 | Carobolante |

FOREIGN PATENT DOCUMENTS

| | | |
|---|---|---|
| JP | H11-219526 | 8/1999 |
| JP | 2005-168220 | 6/2005 |
| JP | 2009-118587 | 5/2009 |
| JP | 2009-189231 | 8/2009 |
| WO | 89/10030 | 10/1989 |
| WO | 2004/018037 | 3/2004 |
| WO | 2009/081115 | 7/2009 |
| WO | 2009/089253 | 7/2009 |

OTHER PUBLICATIONS

PCT Application PCT/US2011/022198; International Search Report and Written Opinion dated May 16, 2012.
"Lock-in detection / Phase detector" in: Paul Horowitz and Winfried Hill: "The art of electronics", Jan. 1, 1989, Cambridge University Press, Cambridge, XP002671605, ISBN: 0521370957, pp. 655, 1031-1033.

* cited by examiner

SYSTEMS AND METHODS FOR DETECTING DATA COMMUNICATION OVER A WIRELESS POWER LINK

BACKGROUND OF THE INVENTION

The present invention relates to wireless power supplies, and more particularly to wireless power supplies with integrated data communications.

There is an increased effort in the market to develop wireless power supply systems capable of charging and/or powering a wide variety of electronic devices. Wireless power supply systems allow power to be delivered to an electronic device without the need for direct-wired connections. This eliminates a variety of problems associated with direct electrical connections, such as the mess and clutter associated with cords as well as the inconvenience associated with repeatedly plugging in and disconnecting charging cords from portable electronic devices.

Many conventional wireless power supply systems rely on inductive power transfer (i.e. the transfer of power using electromagnetic fields) to convey electrical power without wires. A typical inductive power transfer system includes an inductive power supply that uses a primary coil to wirelessly transfer energy in the form of a varying electromagnetic field and a remote device that uses a secondary coil to convert the energy in the electromagnetic field into electrical power. Recognizing the potential benefits, some developers have focused on producing wireless power supply systems with adaptive control systems capable of adapting to maximize efficiency and provide appropriate operation to a variety of different types of devices under a wide range of circumstances. Adaptive control systems may vary operating parameters, such as resonant frequency, operating frequency, rail voltage or duty cycle, to supply the appropriate amount of power and to adjust to various operating conditions. For example, it may be desirable to vary the operating parameters of the wireless power supply based on the number of electronic device(s), the general power requirements of the electronic device(s) and the instantaneous power needs of the electronic device(s). As another example, the distance, location and orientation of the electronic device(s) with respect to the primary coil may affect the efficiency of the power transfer, and variations in operating parameters may be used to optimize operation. In a further example, the presence of parasitic metal in range of the wireless power supply may affect performance or present other undesirable issues. The adaptive control system may respond to the presence of parasitic metal by adjusting operating parameters or shutting down the power supply. In addition to these examples, those skilled in the field will recognize additional benefits from the use of an adaptive control system.

A number of adaptive control systems rely on data communication between the adaptive control system (sometimes referred to as the "primary-side") and the portable electronic device (sometimes referred to as the "secondary-side"). For example, the adaptive control system and the portable electronic device may perform a handshake or otherwise communicate to establish that the portable device is compatible with the wireless power supply. The portable device may also communicate its general power requirements, as well as information representative of the amount of power it is receiving from the wireless power supply. This information may allow the adaptive control system to adjust its operating parameters to supply the appropriate amount of power at optimum efficiency. These and other benefits may result from the existence of a communication channel from the electronic device to the wireless power supply.

To avoid the need for additional communications systems, some existing inductive power supply systems transmit data communications over the existing inductive coupling. For example, the electronic device may include a secondary-side controller that sends communications to the adaptive control system using "backscatter modulation," which places the communications onto the power signal. In this type of system, the secondary-side controller modulates the amount of power that the electronic device draws from the wireless power supply, thereby establishing communications using amplitude modulation of the power signal. In some applications, modulation of the amount of power drawn by the electronic device is achieved by toggling a load on the secondary-side, such as a dedicated load resistor.

At least one existing wireless power supply system uses a current sensor in the primary-side tank circuit to monitor current in the power signal to extract the data communications from the power signal. Although this technique works well and is highly reliable, it may be possible to provide improved reliability in some circumstances. For example, the signal-to-noise ratio inherent in this existing technique may be relatively low in some applications, thereby making it more difficult to discriminate between data and noise.

SUMMARY OF THE INVENTION

The present invention provides a wireless power supply system in which communication signals are detected on the primary-side by monitoring input power to the switching circuit for the tank circuit. The wireless power supply includes a detector circuit with a detector for generating a signal indicative of the current of the input power supplied to the switching circuit. The detector circuit may also include a band-pass filter for filtering the detector output to strip out variations in the signal outside the range of the communication signal, such as the drive signal component and noise. The detector circuit may also include a comparator for converting the filtered signal into high and low signals corresponding to the communications in the power signal. The output of the comparator may be fed into a controller programmed to interpret the communications signals.

In one embodiment, the detector includes an amplifier connected to the input power for the switching circuit with the two inputs of amplifier connected across a resistor to provide a differential that is related to the amount of current in the input power. Accordingly, the output of the detector is a signal that is representative of the current in the switching circuit input power.

In one embodiment, the band-pass filter includes separate low-pass filter circuitry and high pass filter circuitry. The low-pass filter circuitry may be an amplifier-based 2-pole filter. The high-pass filter circuitry may include a capacitor and a resistor.

In one embodiment, the detector circuit includes a signal amplifier disposed between the output of the band-pass filter and the comparator. This signal amplifier may be an AC coupled amplifier. The detector circuit may further include a filter disposed between the signal amplifier and the comparator. This filter may be a low-pass filter, such as an amplifier-based 2-pole filter.

In one embodiment, the filter, amplifier and comparator functions can be performed using a digital signal processor (DSP). For example, the output of the detector may be converted into a digital signal and processed using digital filtering and other digital operations.

In one embodiment, the present invention provides a method for detecting communications modulated onto a power signal in an inductive wireless power supply. In general, the method includes the steps of: (1) producing a signal indicative of current in the input to the switching circuit, (2) filtering the signal with a band-pass filter to remove variations outside the frequency range at which communications are produced in the secondary-side electronic device, (3) amplifying the filtered signal, (4) filtering the amplified signal to further remove noise and isolate the signal, (5) converting the filtered signal into high and low signals corresponding to the communications using a comparator, and (6) feeding the converted signals into a controller programmed to interpret the high/low signals as a binary data stream.

In a second aspect, the present invention provides a wireless power supply system in which communication signals are detected on the primary-side based on changes in the phase relationship between the current and the voltage in the primary-side tank circuit. The wireless power supply includes a detector circuit with circuitry for generating a signal that varies in dependence on the phase of the current in the tank circuit. The detector circuit may also include a band-pass filter for filtering the phase signal to strip out variations in the signal outside the range of the communication signal, such as the drive signal component and noise. The detector circuit may also include a comparator for converting the filtered signal into a high or low signal corresponding to the data communication signal. The output of the comparator may be fed into a controller programmed to interpret the communications signals.

In one embodiment of this second aspect, the detector may include an input taken from the tank circuit across the ballast capacitors and phase conversion circuitry for converting the input signal into a signal that varies with the phase of the current in the tank circuit. The phase conversion circuitry may include a buffer for creating a buffered copy of the input signal and an inverting buffer for creating an inverted buffer copy of the input signal. The phase conversion circuitry may also include a multiplexer for generating an output signal that is a time-sliced combination of the non-inverted buffer copy and the inverted buffer copy. The multiplexer includes an input for controlling the timing of the multiplexer. The input may be coupled to a switching circuit drive signal so that the output of the multiplexer alternates between the non-inverted buffer copy and the inverted buffer copy in synchronization with the timing of the switching circuit. The detector circuitry may also include averaging circuitry that produces an output signal indicative of a running average of voltage in the multiplexer output. By synchronously timing slicing the primary current waveform, a phase change can be seen as a DC voltage level shift in the output of the averaging circuitry.

In one embodiment of this second aspect, the timing of the multiplexer is controlled by the high-side switch drive signal. When this signal is high, the non-inverted copy of the waveform is sent to the multiplexer output. When the signal is low, the inverted copy is sent to the multiplexer output.

In one alternative embodiment of the second aspect, the detector circuit includes an integrator circuit rather than averaging circuitry for converting the multiplexer output into a signal that varies in dependence on the phase of the current in the tank circuit. In this alternative embodiment, the integrator circuit output may represent a summation of the multiplexer output signal over time rather than an average of the multiplexer output signal over time.

In one embodiment, the present invention provides a method for detecting communications modulated onto a power signal in an inductive wireless power supply. In general, the method includes the steps of: (1) generating a signal that varies with changes in the phase of the current in the tank circuit; (2) filtering the signal with a band-pass filter to remove variations outside the frequency range of the communications, (3) amplifying the filtered signal, (4) filtering the amplified signal to further remove noise and isolate the signal, (5) converting the filtered signal into high and low signals corresponding to the communications, and (6) feeding the converted signals into a controller programmed to interpret the high/low signals as a binary data stream.

In one embodiment, the step of generating a signal that varies with changes in the phase of the current in the tank circuit includes the steps of: (1) providing a signal indicative of current in the tank circuit, (2) producing a buffer copy of the signal, (3) producing an inverted buffer copy of the signal, (4) combining the buffer copy and the inverted buffer copy into a time-sliced waveform alternating between the non-inverted copy and the inverted copy based on the timing of the switching circuit, and (5) producing a signal representing a running average of the time-sliced waveform.

The present invention provides simple and effective systems and methods for detecting data communications in the power signal across an inductive load. In the switching circuit input power detection system and method, the input current scales more linearly and more predictably with the current of the secondary-side. This allows the system to be designed for a smaller overall input range and provides a higher signal to noise ratio. The end detection may be simpler and as a result more robust over the operating frequency range. Further, when the imaginary power (primary coil current) remains constant despite a varying load, the real power consumed by the electronic device still changes. By detecting power drawn from the input to primary coil, this change can be seen and translated into digital data. In the phase change detection system and method, the phase change due to a communication load is more linear and presents a higher signal-to-noise ratio than amplitude. When data is present, it causes a phase shift that results in an imbalance between the positive and negative portions of the waveform, which can be detected as a DC level change. The synchronous time slicing allows the positive and negative portions of the current waveform to settle to a constant voltage that may be filtered from the signal when no communications is occurring. Portions of the signal due to changes in the load will self-cancel, allowing the signal derived from the phase change to be clearly detected. As a result, there is less chance of missing communications due to a change in the power from the device.

These and other advantages and features of the invention will be more fully understood and appreciated by reference to the description of the embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF CURRENT EMBODIMENTS

The present invention is directed to systems and methods for detecting on the primary-side of a wireless power supply data communications modulated onto the power signal on the secondary-side. In one aspect, the present invention detects communications in the input power to the switching circuit. In this aspect of the invention, the wireless power supply includes a detector for generating a signal indicative of the current in the input to the switching circuitry, a band-pass filter for filtering the detected signal, an amplifier for amplifying the filtered signal, a filter for filtering the amplified signal and a comparator for converting the final signal into a stream of high and low signals that can be passed to a controller for processing as binary data stream. In a second aspect, the present invention detects communications through changes in the phase relationship between the current and voltage in the primary-side tank circuit. In this second aspect, the wireless power supply includes a detector for generating a signal that varies in dependence on changes in the phase relationship between the current and the voltage in the primary-side tank circuit, a band-pass filter for filtering the signal, an amplifier for amplifying the filtered signal, a filter for filtering the amplified signal and a comparator for converting the final signal into a stream of high and low signals that can be passed to a controller for processing as binary data stream.

Figure 1:
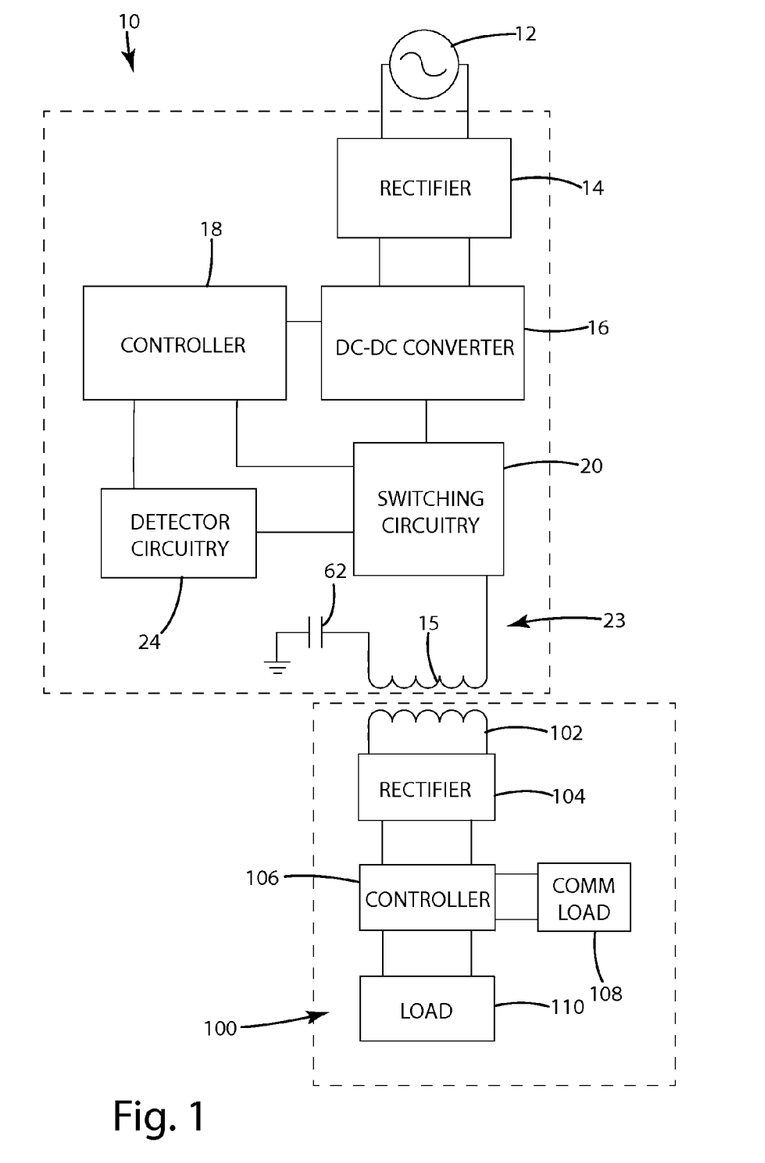
FIG. 1 is a schematic representation of a wireless power supply system in accordance with an embodiment of the present invention.

An inductive wireless power supply system 10 in accordance with an embodiment of the present invention is shown in FIG. 1. The system 10 generally includes an AC mains input 12, a rectifier 14, a DC-DC converter 16, a controller 18, a switching circuit 20, a tank circuit 23 and a detector circuit 24. In this embodiment, the tank circuit 23 includes a primary coil 15 and a ballast capacitor 62; however, the configuration of the tank circuit 23 may vary from application to applications. The detector circuit 24 is coupled to the input power for the switching circuit 20. The detector circuit 24 includes an amplifier 26 arranged to produce an output signal that is directly proportional to the current in the input power $I_i$. The detector circuit 24 also includes band-pass circuitry 28 for removing variation in the output signal that do not fall within the frequency range of the communication signal. The detector circuit 24 may also include an amplifier 30 for amplifying the filtered signal. The detector circuit 24 may also include a comparator 32 for converting the amplifier output to a high or low signal. The comparator output 32 is provided to a controller, such as controller 18, which interprets the high and low signals as a binary data stream.

FIG. 1 also shows a portable electronic device 100 capable of receiving wireless power from the wireless power supply 10. The electronic device 100 is generally conventional and therefore will be described in limited detail. The electronic device 100 generally includes a secondary coil 102, a rectifier 104, a controller 106, a communications load 108 and a load 110. The secondary coil 102 may be a coil of wire or essentially any other inductor capable of generating electrical power in response to the varying electromagnetic field generated by the wireless power supply system 10. The rectifier 104 converts the AC power into DC power. Although not shown, the device 100 may also include a DC-DC converter in those embodiments where conversion is desired. The controller 106 is configured to apply the rectified power to the load 110. In this embodiment, load 110 represents the electronics of the device 100. In some applications, the load 110 may include a power management block capable of managing the supply of power to the electronics of the device 100. For example, a conventional electronic device may include an internal battery. The power management block may determine when to use the rectified power to charge the device's internal battery and when to use the power to power the device. It may also be capable of apportioning the power between battery charging and directly powering the device. In some applications, the load 110 may not include a power management block. In such applications, the controller 106 may be programmed to handle the power management functions or the electronic device 100 may include a separate controller for handling power management functions. The controller 106 also includes communication programming that enables the controller 106 to selectively apply the communication load 108 to create data communications on the power signal using a backscatter modulation scheme.

Figure 2A:
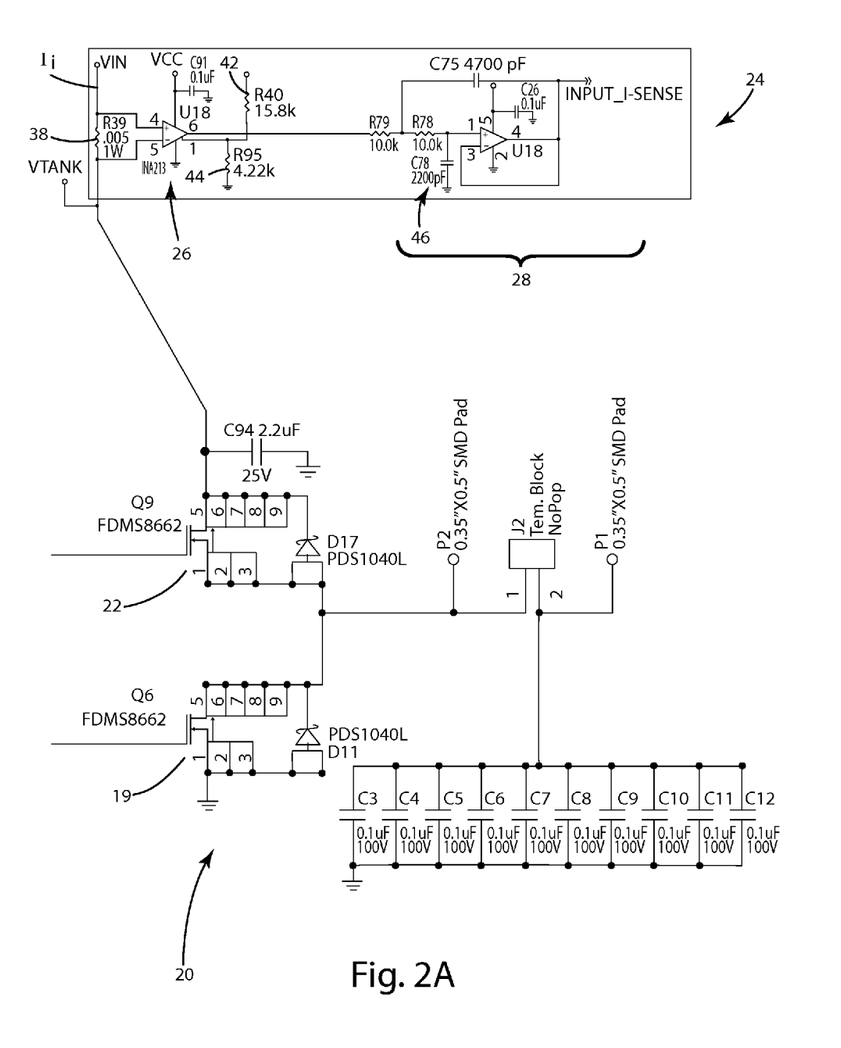
FIG. 2 is a circuit diagram showing the detector circuit.
Figure 2B:
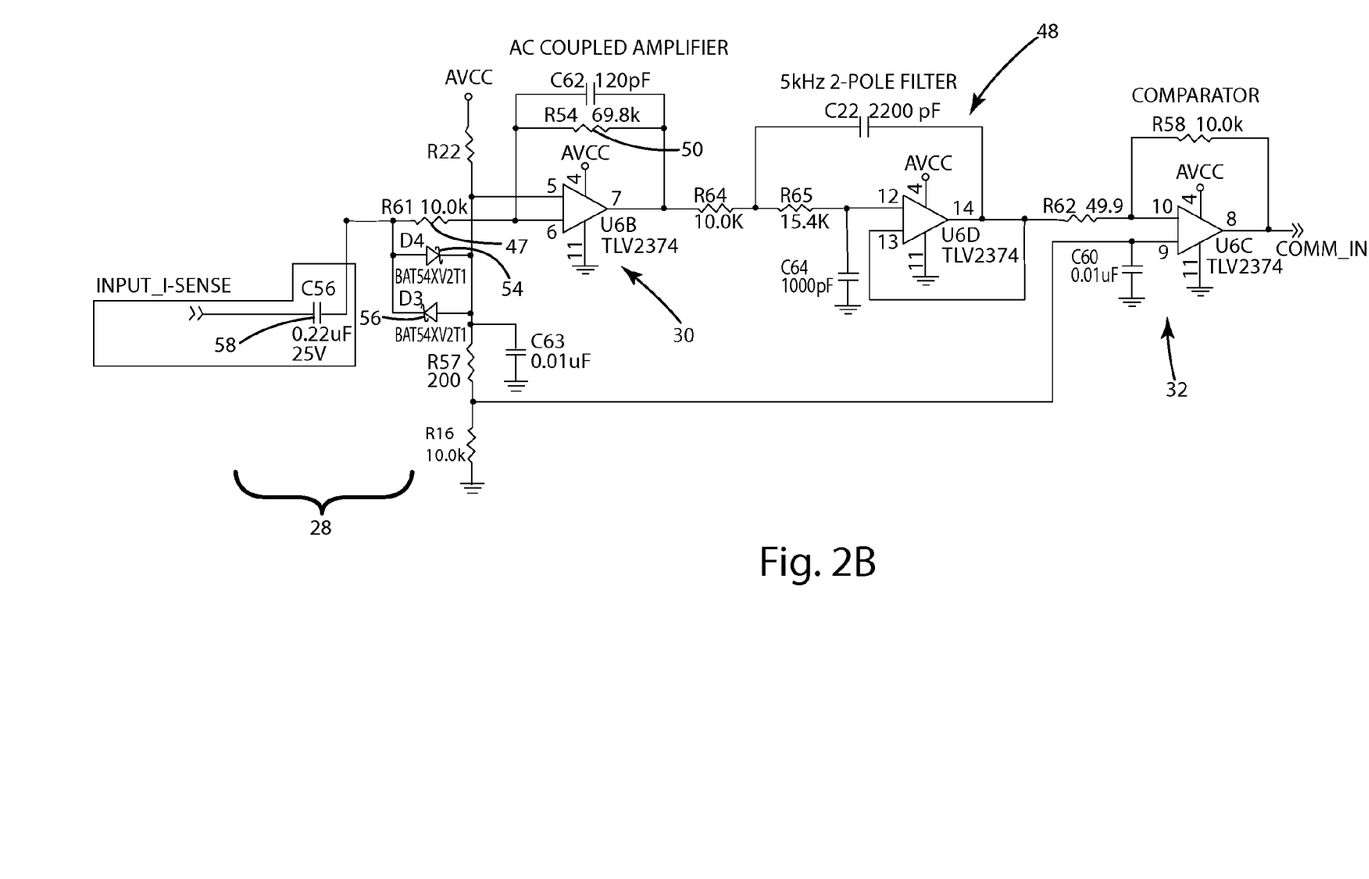

FIG. 2 is a circuit diagram showing one embodiment of the detector circuit 24. This circuit diagram shows the switches 22, 19 of the switching circuit 20. Although not shown in FIG. 2, the primary coil 15 (See FIG. 1) may be connected to the solder pads P1 and P2 or to the jumper J2. As shown in FIG. 2, the detector circuit 24 includes an amplifier 26 that is coupled to the input power $I_i$ for the switching circuit 20. In this embodiment, the two inputs to the amplifier 26 are connected across a resistor 38. The value of resistor 38 may be selected based on the anticipated variations in current to utilize the full differential range of the amplifier 26. Alternative amplifier arrangements may be used in alternative embodiments. For example, in some embodiments, resistor 38 may be moved to the opposite side of the switching circuit 20 (between the switching circuit 20 and ground) and the second lead of the amplifier 26 may be coupled to ground. In this embodiment, the amplifier 26 includes an input that is coupled to VCC with a pair of resistors 42, 44 selected to set a zero reference. The detector circuit 24 may also include filtering and conditioning circuitry for filtering and condition the output of amplifier 26 before it is passed to comparator 32. In this embodiment, the detector circuit 24 includes a low-pass filter 46 that functions primarily to remove (or attenuate) high frequency oscillations that are above the frequency range of the data communications. As shown, the low-pass filter may be a 2-pole filter with circuit components selected to set the appropriate filtering range. The detector circuit 24 show in FIG. 2 also includes a high-pass filter that functions primarily to remove (or attenuate) low frequency oscillations that are below the frequency range of the data communications, including without limitation any DC component in the signal. The high-pass filter includes resistor 47 and capacitor 58.

In the illustrated embodiment, the detector circuit 24 includes an amplifier 30 for amplifying the signal after it has passed through the low-pass and high-pass filters. The amplifier 30 is configured to amplify the signal to help differentiate the signal from the noise. The amplifier 30 is a generally conventional AC coupled amplifier. The gain of the amplifier 30 may be varied based on the values of resistors 47 and 50. The detector circuit 24 may include settling diodes 54, 56 to help prevent large changes in the signal from saturating the amplifier 30.

The detector circuit 24 shown in FIG. 2 also includes a filter 48 for filtering the output of the amplifier 30. In this embodiment, the filter 48 is a low-pass filter configured to remove high frequency noise that may be present in the output of the amplifier 30. The filter 48 may be a 2-pole filter, as shown.

The comparator 32 include two inputs—the first of which is coupled to the output of filter 48 and the second of which is coupled to a reference signal that, in this embodiment, is set to be slightly lower than the DC component of the amplified signal. Accordingly, the comparator output will remain high when no communication is present in the signal. If communication is present, then the comparator output toggles between high and low in correspondence with the communication signals.

The output of the comparator 32 is fed to the controller 18, which analyzes the signals as a binary data stream. In the illustrated embodiment, the remote electronic device uses a differential bi-phase encoding scheme to modulate data bits onto the power signal. With this method, a binary 1 is represented in the communication stream using two transitions in the power signal with the first transition coinciding with the rising edge of the clock signal and the second transition coinciding with the falling edge of the clock signal. A binary 0 is represented by a single transition in the power signal coinciding with the rising edge of the clock signal. Accordingly, the controller 18 is configured to decode the comparator 32 output using a corresponding scheme. The present invention is not limited, however, to use in connection with differential bi-phase encoding, but may instead be configured to use essentially any communication scheme or methodology.

Although the present invention is described in connection with a detector circuit 24 having a variety of amplifier blocks and other analog circuitry for filtering and conditioning the signal before it is fed to the controller 18, the filtering, conditioning and/or comparator functions may alternatively be carried out using a digital signal processor (DSP). In this alternative, the output of amplifier 26 may be fed into a DSP. The DSP converts the analog signal into a digital signal and then processes the digital signal to generate high and low outputs that are consistent with the high and low outputs that would have been generated using the circuitry described above. For example, the DSP may process the input signal to remove signal components occurring outside the frequency range used for communications, analyze the remaining signal to identify the communication signals then provide an output signal that drives high and low with the communication signals.

Figure 3:
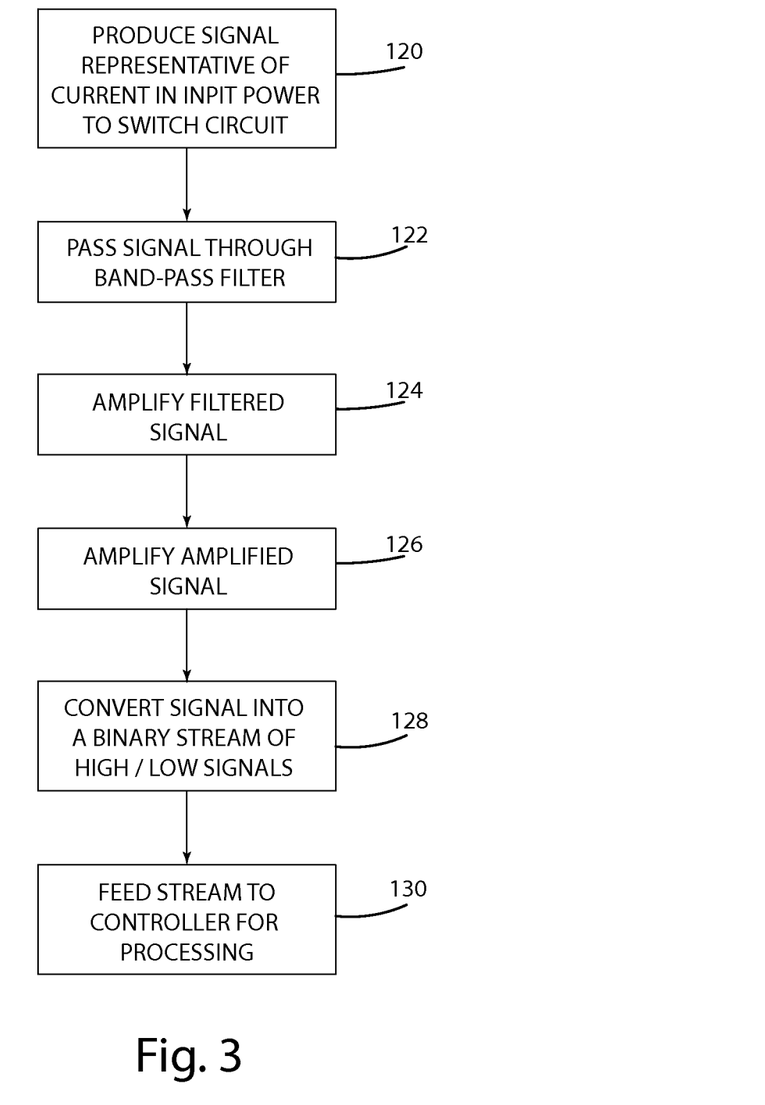
FIG. 3 is a flow chart showing the general steps of the input power detection algorithm.

Referring now to FIG. 3, the present invention provides a method for detecting data communications on the primary-side of an inductive power supply system 10. In general, the method includes the steps of: (1) producing a signal indicative of current in the input $I_i$ to the switching circuit 120, (2) passing the signal through a band-pass filter 28 to remove variations outside the frequency range at which communications are produced in the secondary-side electronic device 122, (3) amplifying the filtered signal 124, (4) filtering the amplified signal to further remove noise and isolate the signal 126, (5) running the filtered signal through a comparator 32 to produce a high or low signal corresponding to the status of the communication signal 128, and (6) feeding the comparator 32 output into a controller programmed to interpret the high/low signals as a binary data stream 130.

In this embodiment, the step of producing a signal indicative of current in the input power to the switching circuit includes coupling an amplifier block 26 to the input $I_i$ to switching circuit. The positive and negative inputs of the amplifier 26 are connected along the input line across a resistor 38. The resistor 38 produces a differential in the voltage between the positive and negative inputs that is proportional to the current input power. In effect, the resistor performs a current-to-voltage conversion. The amplifier 26 outputs a waveform that is representative of the difference in voltage between the positive and negative inputs. The gain of the amplifier 26 may vary from application to application depending in part on the amplitude of the modulated communication signals and the signal-to-noise ratio. This step may alternatively be carried out by other circuitry capable of producing a waveform representative of the current in the input power to the switching circuit.

In this embodiment, the step of passing the signal through a band-pass filter to remove variations outside the frequency range at which communications are produced in the secondary-side electronic device includes the steps of passing the waveform through a low-pass filter 46 and a high-pass filter 48. In the illustrated embodiment, the wireless power drive signal occurs at a frequency much higher than the frequency of the communications. Accordingly, in this embodiment, the low-pass filter 46 is configured primarily to remove the drive signal component and other high frequency noise from the waveform. In the illustrated embodiment, it is anticipated that variations in the load of electronic device will generally occur at frequencies much lower than the frequency of the communications. Accordingly, the high-pass filter 48 of this embodiment is configured primarily to remove the load component and lower frequency noise from the waveform. The high-pass and low-pass filters may alternatively be replaced by other circuitry capable of isolating the communication signal.

In the illustrated embodiment, the step of amplifying the filtered signal includes the steps of passing the signal through an AC coupled amplifier 30. The amplifier 30 amplifies the waveform with a gain that may vary from application to application. The amplification improves the waveform by creating greater separation between the signal and noise in the waveform. Although this step is performed by an AC coupled amplifier, the signal may be alternatively be amplified by other types of amplifiers.

In the illustrated embodiment, the step of filtering the amplified signal includes passing the amplified signal through a low-pass filter 48. In this embodiment, a low-pass filter 48 is used primarily to remove circuit noise from the waveform. In other applications, the amplified signal may be passed through additional or alternative types of filters. In some applications, the amplified waveform may not need filtering and may therefore be passed directly into the comparator.

In this embodiment, the step of running the filtered signal through a comparator includes the steps of coupling the filtered signal to one input of the comparator 32 and coupling a reference to the other input of the comparator 32. The filtered signal may be centered about a small DC voltage that may vary from application to application. The reference may be set to be roughly equivalent to the DC component of the filtered signal, but slightly lower. Accordingly, the output of the comparator 32 is high when no communication is present, and toggles between high and low as appropriate when communication is present. In applications where it is desirable for the output of the comparator 32 to be low when no communication is present, the reference may be set to be slightly higher than the DC component of the filtered signal. Although the waveform is converted into a high/low stream using a comparator in the illustrated embodiment, this function may be implemented by other circuitry in alternative embodiments.

Figure 4:
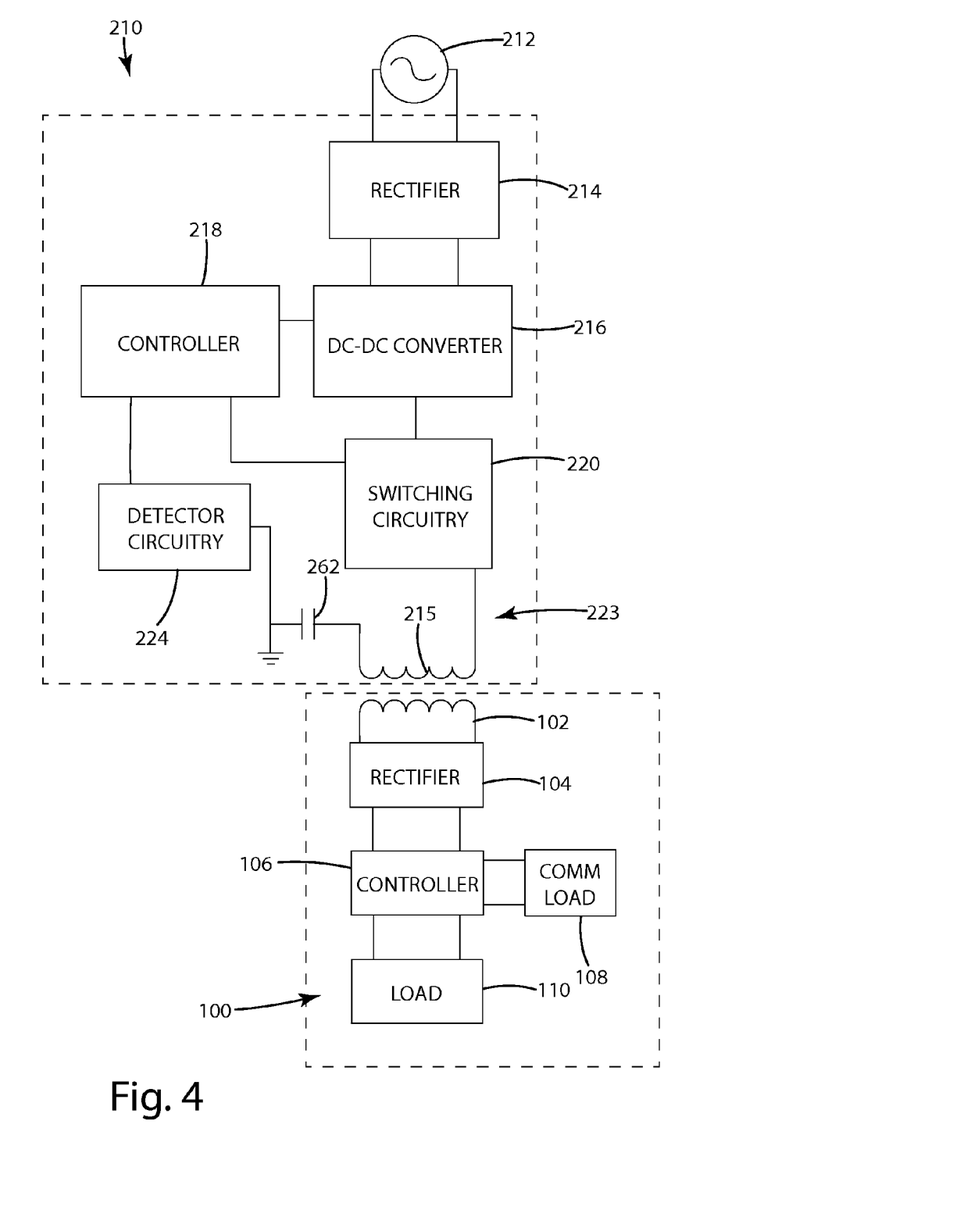
FIG. 4 is a schematic representation of a wireless power supply system in accordance with a second aspect of the present invention.
Figure 5A:
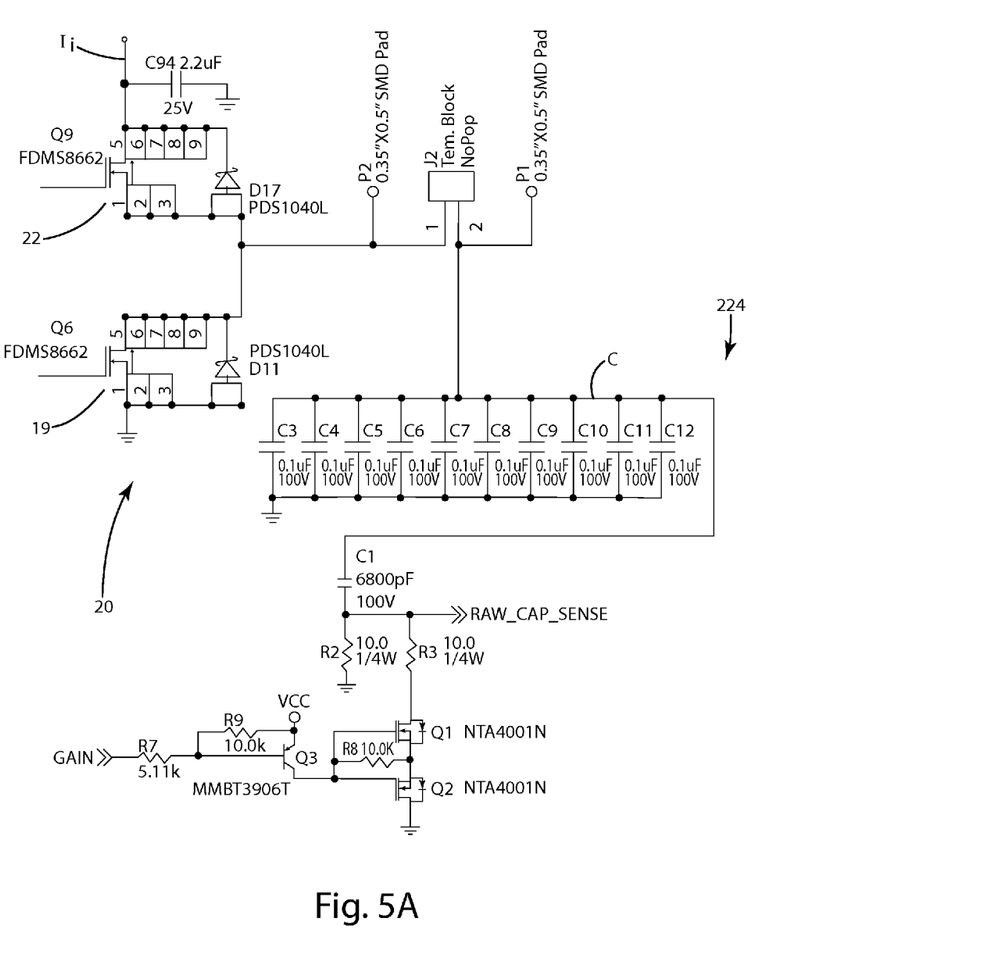
FIG. 5 is a circuit diagram showing the detector circuit.
Figure 5B:
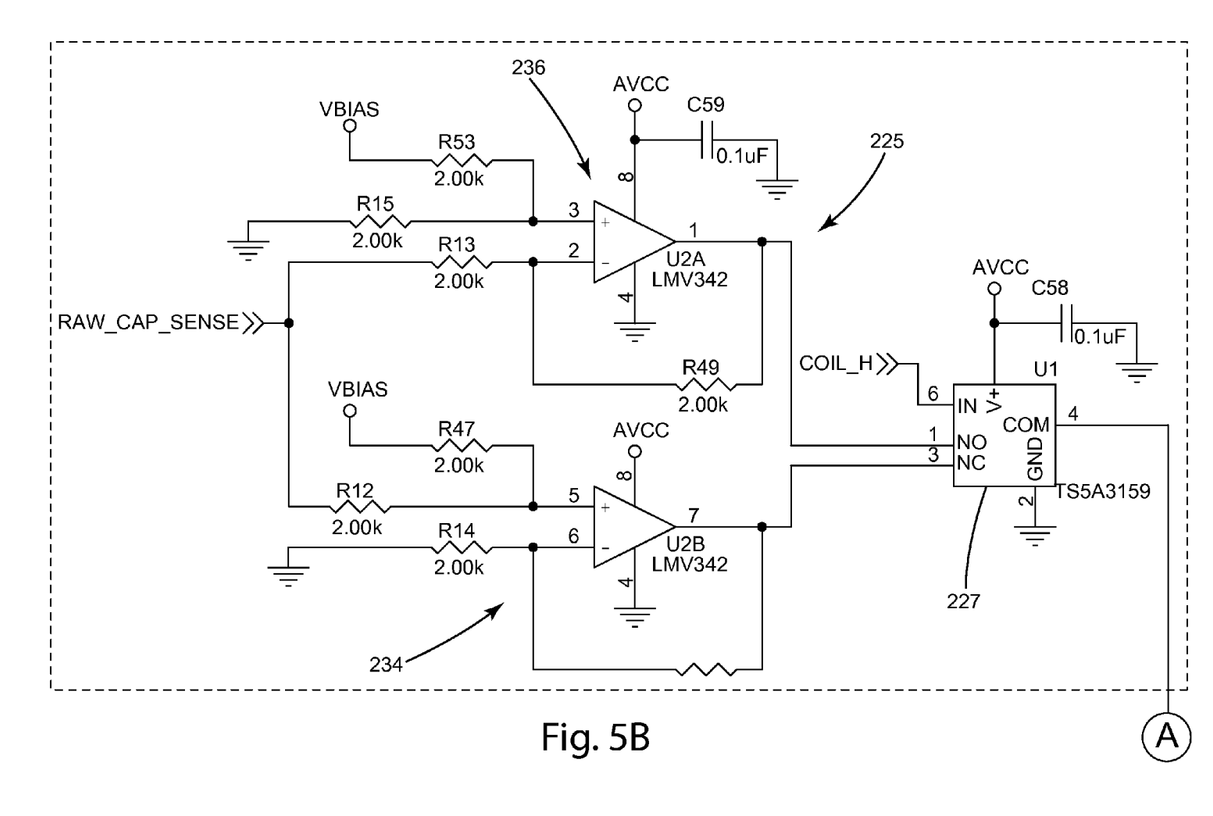
Figure 5C:
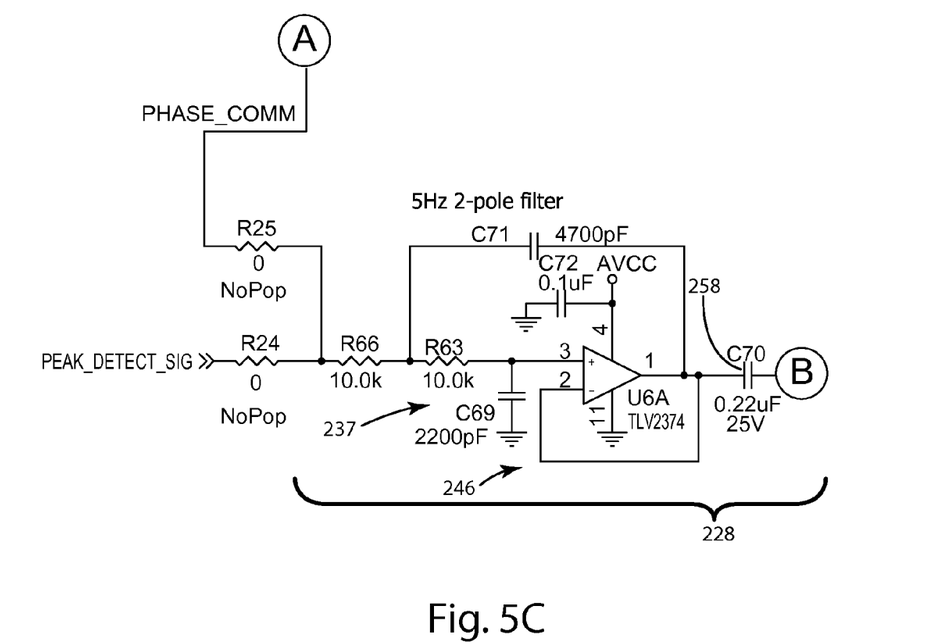
Figure 5D:
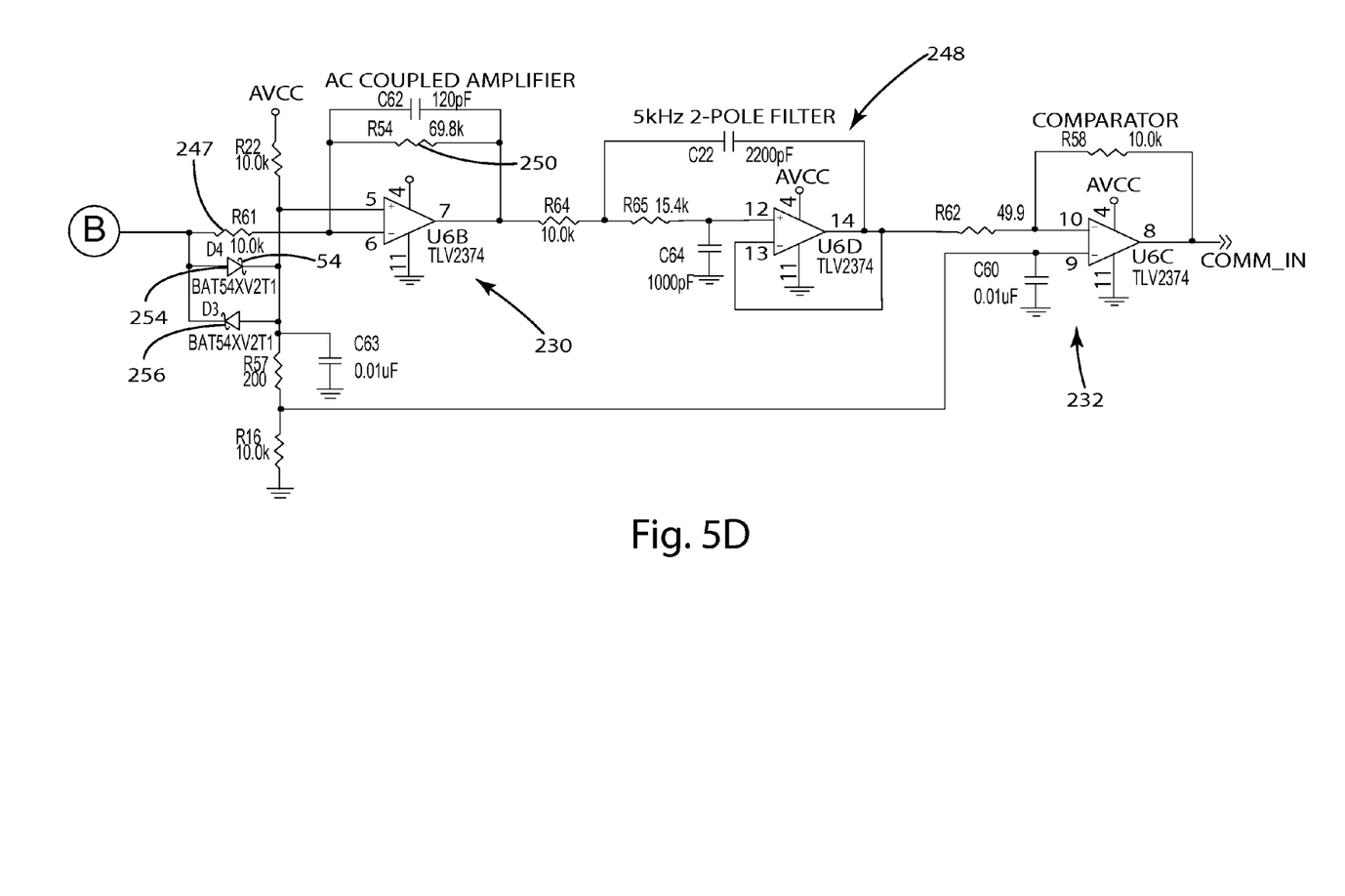

As noted above, a second aspect of the present invention provides a system and method for detecting communications using the phase relationship of the current and the voltage in the primary-side tank circuit. Referring now to FIG. 4, the system 210 of one embodiment of the second aspect generally includes an AC mains input 212, a rectifier 214, a DC-DC converter 216, a controller 218, a switching circuit 220, a tank circuit 223 and a detector circuit 224. In this embodiment, the tank circuit 223 includes a primary coil 215 and a ballast capacitor 262; however, the configuration of the tank circuit 223 may vary from application to applications. The detector circuit 224 of this embodiment is coupled to the tank circuit 223 to produce an input signal that is proportional to the current in the tank circuit 223. The detector circuit 224 includes buffer circuitry 225 for producing a buffer copy and a separate inverted buffer copy of the input signal. The detector circuit 224 also includes a multiplexer 227 for alternately outputting either buffer copy or inverted buffer copy in accordance with the timing of the switching circuit 20. The detector circuit 224 includes averaging circuitry 237 that maintains a running average of the output of the multiplexer 227. The detector circuit 224 also include band-pass circuitry 228 for removing variations in the signal that do not fall within the frequency range of the communication signal. The detector circuit 224 may also include an amplifier 230 for amplifying the filtered signal, and a filter 248 for filtering the amplified signal. The detector circuit 224 may also include a comparator 232 for converting the amplifier output to a high or low signal. The comparator output 232 is provided to a controller, such as controller 218, which interprets the high and low signals as a binary data stream.

FIG. 5 is a circuit diagram showing the detector circuit 224 of one embodiment. As shown, the detector circuit 224 of this embodiment obtains its input signal via a connection C to the tank circuit 223 across the ballast capacitors 262. The detector circuit 224 includes a buffer amplifier 234 that provides a buffered copy of the input signal, and an inverting buffer amplifier 236 that provides an inverted buffered copy of the input signal. The detector circuit 224 includes a multiplexer 227 with two inputs that are coupled to the buffer amplifier 234 and the inverting buffer amplifier 236. The multiplexer 227 is configured to alternately output the signal from the buffer amplifier 234 or the inverting buffer amplifier 236 in sequence with the drive signals for the driver of the high side switch (e.g. high side FET). More specifically, when the high side FET driver signal is high, the output of the buffer amplifier 234 is sent to the multiplexer output, and when the high side FET driver signal is low, the output of the inverting buffer amplifier 236 is sent to the multiplexer output.

The detector circuit 224 includes averaging circuit 237 for producing an output signal representative of a running average of the output signal from the multiplexer 227. In this embodiment, the averaging circuit 237 includes an amplifier arranged as a 2-pole filter 246. The 2-pole filter 246 functions not only as an averaging circuit 237, but also a low-pass filter as described above in connection with filter 46. In this embodiment, filter 246 is essentially identical to filter 46 described above. Accordingly, filter 246 will not be described in detail. In an alternative embodiment, the detector circuit 224 may include an integrator circuit (not shown) rather than an averaging circuit for converting the multiplexer output into a signal that varies in dependence on the phase of the current in the tank circuit. In this alternative embodiment, the integrator circuit output may represent a summation of the multiplexer output signal over time rather than an average of the multiplexer output signal over time.

The remaining filtering and condition components of the detector circuit 224 are essentially identical to those described above in connection with detector circuit 24. Accordingly, those components will not be described in detail in connection with this aspect of the present invention. Suffice it to say that detector circuit 224 also includes a high-pass filter with resistor 247 and capacitor 258, an AC coupled amplifier 230 configured to amplify the filtered signal, a low-pass filter 248 configured to filter the amplified signal and a comparator 232 configured to convert the waveform into a stream of high and low signals.

As with the input power detection systems described above, various functions carried out by the analog circuitry illustrated in connection with the phase change detection embodiments may alternatively be carried out using a digital signal processor (DSP). In this alternative, the input signal taken from the tank circuit may be fed into a DSP for processing. In another embodiment of this alternative, the output of multiplexer 227 may be fed into a DSP. As with the input power embodiments, the DSP may convert the analog signal into a digital signal and then processes the digital signal to generate high and low outputs that are consistent with the high and low outputs that would have been generated using the circuitry described above. In applications that utilize a DSP without an internal analog-to-digital converter, the analog signals may be fed through a separate analog-to-digital converter before passing into the DSP.

Figure 6:
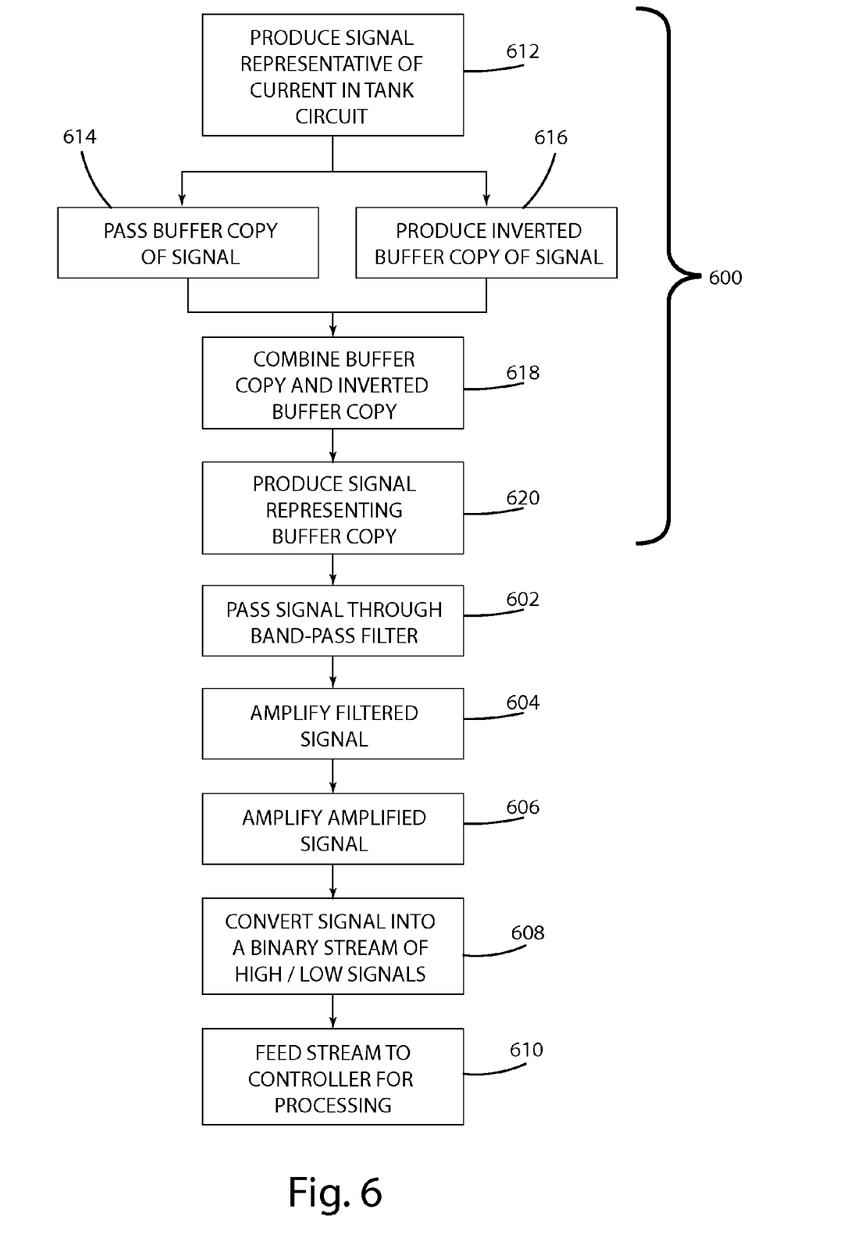
FIG. 6 is a flow chart showing the general steps of the phase change detection algorithm.

Referring now to FIG. 6, the present invention provides a method for detecting data communications on the primary-side of an inductive power supply system 210. In general, the method includes the steps of: (1) generating a signal that varies with changes in the phase of the current in the tank circuit 600, (2) filtering the signal with a band-pass filter to remove variations outside the frequency range of the communications 602, (3) amplifying the filtered signal 604, (4) filtering the amplified signal to further remove noise and isolate the signal 606, (5) converting the filtered signal into a stream of high and low signals corresponding to the communications using a comparator 608, and (6) feeding the converted signals into a controller programmed to interpret the high/low signals as a binary data stream 610. As can be seen, steps (2)-(6) are essentially identical to those described above in connection with the first aspect of the present invention. Accordingly, steps (2)-(6) will not be described in detail in connection with this second aspect of the present invention.

The step of generating a signal that varies with changes in the phase of the current in the tank circuit includes the steps of: (1) providing a signal indicative of current in the tank circuit 612, (2) producing a buffer copy of the signal 614, (3) producing an inverted buffer copy of the signal 616, (4) combining the buffer copy and the inverted buffer copy into a time-sliced waveform alternating between the non-inverted copy and the inverted copy based on the timing of the switching circuit 618, and (5) producing a signal representing a running average of the time-sliced waveform 620.

In this embodiment, the step of providing a signal indicative of current in the tank circuit includes coupling a pair of buffer circuits to the tank circuit 223 across the ballast capacitors 262. In this arrangement, the ballast capacitors 262 function as a current to voltage converter such that the signal input to the pair of buffer circuits 234, 236 is a voltage that is proportional to the current in the tank circuit 223. Different techniques for obtaining a signal indicative of current may be used in alternative embodiments.

The step of producing a buffer copy of the signal includes feeding the signal into a buffer amplifier 234 with a gain of one. The specific buffer amplifier arrangement may vary from application to application.

The step of producing an inverted buffer copy of the signal includes feeding the signal into an inverting buffer amplifier 236 with a gain of negative one. The specific buffer amplifier arrangement may vary from application to application.

The step of combining the buffer copy and the inverted buffer copy includes passing the output of the two buffer amplifiers 234, 236 into a multiplexer 227 and controlling the multiplexer 227 to alternately output either the non-inverted copy or the inverted copy in synchronous time slices. In this embodiment, the control input of the multiplexer 227 is coupled to the control signal from the controller 218 for one of the switching circuit drivers—in this case the driver for the high side switch 22. In this embodiment, the control signal is a logic output from the controller 218 that is suitable to directly drive operation of the multiplexer 227. As a result, the multiplexer 227 outputs a waveform that can be averaged or integrated to provide a signal that varies with changes in the phase of the current in the tank circuit 223. Although the illustrated embodiment includes a multiplexer 227, the function of the multiplexer may alternatively be carried out by other circuitry capable of producing a waveform that represents a time-sliced combination of the buffered copy and inverted buffer copy synchronously with the timing of the switching circuit.

Figure 7:
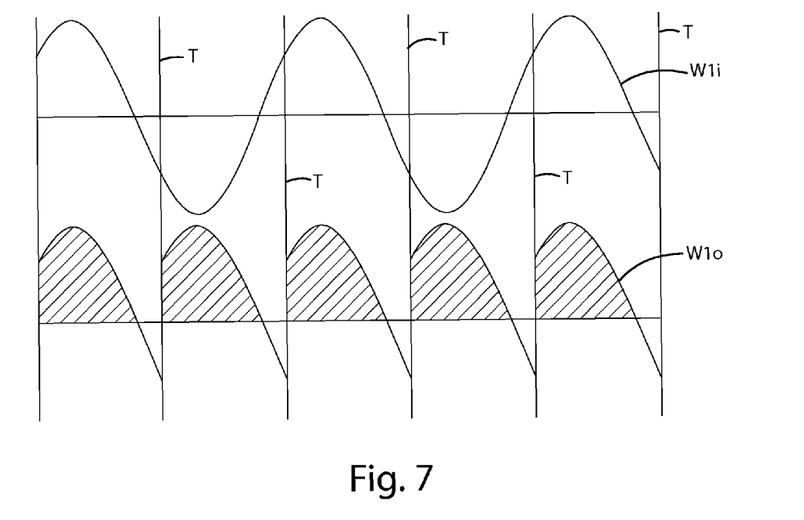
FIG. 7 is an illustration showing the input and output of the multiplexer.
Figure 8:
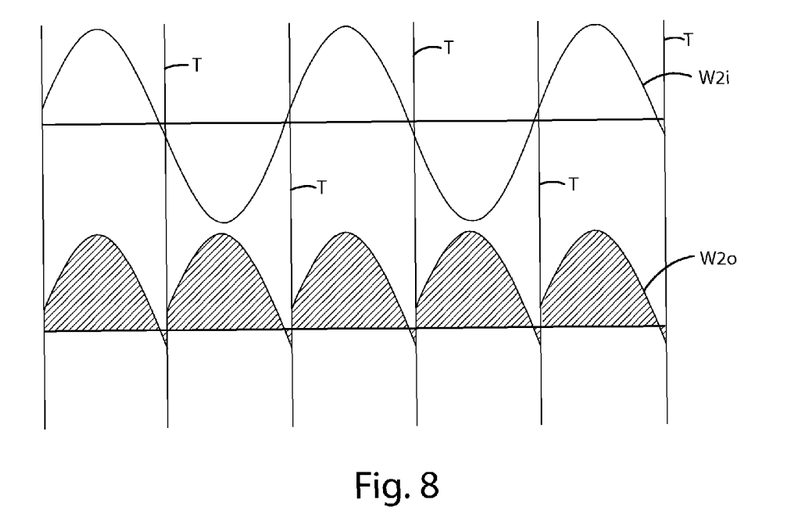
FIG. 8 is an illustration showing the input and output of the multiplexer when the current is at a different phase than shown in FIG. 7.

FIGS. 7 and 8 show the input waveform and the time-sliced output of the multiplexer when the phase relationship is at two different points. In these illustrations, the upper sinusoidal waveforms $W1_i$, $W2_i$ represent the voltage waveform entering the inverting and non-inverting buffers. The vertical black lines T in the illustrations represent the timing of the high side switch. More specifically, each black line represents the time at which the control signal to the driver for the high side switch transitions between logic values. Referring now to FIG. 7, waveform $W1_o$ shows the time-sliced combination of the voltage waveform output by the multiplexer. As can be seen, every other time-slice is inverted so that a running average of the combined waveform (or alternatively the integral of the waveform) will vary with the phase of the current. Referring now to FIG. 8, it can be seen that the phase of the input waveform $W2_i$ is closer to resonance than input waveform $W1_i$ (i.e. the zero crossings of the waveform are closer to the transitions in the drive control). In the illustrated embodiment, the system 10 generally operates above resonance and an increase in load results in a shift of the current closer to resonance. Accordingly, in this embodiment, waveform $W1_i$ represents a period of time during which the communication load is not being applied on the secondary-side and waveform $W2_i$ represents a period of time during which the communication load is being applied. In alternative embodiments, application of the communication load may move the input waveform farther from resonance (e.g., when the system generally operates at resonance). In such alternative applications, it may be desirable to invert the output of the comparator or otherwise accommodate for this difference. As another option, the controller can be configured to read data of the opposite polarity, which can be readily implemented in the context of biphase encoding because the data in held in transitions rather than levels. In the illustrated embodiment, waveform $W2_o$ shows the time-sliced waveform output by the multiplexer. Given that the negative portion of waveform $W2_o$ is smaller than the negative portion of waveform $W1_o$, the running average of waveform $W2_o$ will be greater than the running average of waveform $W1_o$.

In this embodiment, the step of producing a signal representing a running average of the time-sliced waveform includes passing the signal into an amplifier arrangement. The illustrated embodiment incorporates an amplifier arrangement that performs two functions. More specifically, filter 246 functions as both a low-pass filter and as an averaging circuit. Accordingly, the filter 246 outputs a low-pass filtered, running average of the waveform output by the multiplexer. In alternative embodiments, these functions may be performed by separate circuit components.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A wireless power supply system, comprising:
 a tank circuit arranged to generate an electromagnetic field in response to a supply of input power;
 switching circuitry coupled to said tank circuit, said switching circuitry controlling said supply of input to said tank circuit to generate said electromagnetic field;
 a power supply operatively coupled to said tank circuit via said switching circuitry, said power supply supplying an input power to said switching circuitry;
 a detector coupled to said switching circuitry outside said tank circuit, said detector for generating a signal indicative of said input power supplied to said switching circuitry, wherein said input power is provided to said tank circuit; and
 a controller for interpreting said generated signal to extract data communications carried on said generated signal.

2. The wireless power supply of claim 1 wherein said detector includes an amplifier operatively coupled to said input power, said amplifier including two inputs connected to said input power across a resistor, whereby said generated signal is representative of a current in said input power.

3. The wireless power supply of claim 1 further including filtering circuitry arranged between said detector and said controller, said filtering circuitry filtering said signal to improve differentiation of communication signals carried in said generated signal.

4. The wireless power supply of claim 3 wherein said filtering circuitry is further defined as band-pass filtering circuitry.

5. The wireless power supply of claim 4 wherein said band-pass filtering circuitry includes separate low-pass filtering circuitry and high-pass filtering circuitry.

6. The wireless power supply of claim 3 further including a comparator disposed between said detector and said controller, said comparator arranged to convert said generated signal into high and low signals corresponding to communications carried on said generated signal.

7. The wireless power supply of claim 6 further wherein said filtering circuitry and said comparator are embodied in a digital signal processor.

8. A wireless power supply system comprising:
a tank circuit arranged to generate an electromagnetic field in response to a supply of input;
a power supply operatively coupled to said tank circuit, said power supply supplying an input power to said tank circuit;
a detector for generating a signal indicative of a phase relationship between a current and a voltage in said tank circuit, said detector includes phase conversion circuitry configured to receive an input signal indicative of the current in said tank circuit, wherein said phase conversion circuitry is configured to generate an output signal that is a time-sliced combination of a buffer copy of the input signal and an inverted buffer copy of the input signal; and
a controller for interpreting said generated signal to extract data communications carried on said generated signal.

9. The wireless power supply system of claim 8 wherein said input signal is taken from said tank circuit across a ballast capacitor and, wherein said phase conversion circuitry is configured to convert said input signal into said output signal such that said output signal varies with a phase of said current in said tank circuit.

10. The wireless power supply system of claim 9 wherein said phase conversion circuitry includes a buffer for creating said buffer copy of said input signal and an inverting buffer for creating said inverted buffer copy of said input signal.

11. The wireless power supply system of claim 10 wherein said phase conversion circuitry includes a multiplexer for generating said output signal such that said output signal is a time-sliced combination of said buffer copy and said inverted buffer copy.

12. The wireless power supply system of claim 11 wherein said power supply includes a switching circuit; and
wherein said multiplexer includes an input for controlling a timing of said multiplexer, said input being operatively couple to a drive signal for said switching circuit so that said output signal alternates between said buffer copy and said inverted buffer copy in substantial synchronization with a timing of said switching circuit.

13. The wireless power supply system of claim 12 wherein said detector includes averaging circuitry arranged such that said output signal is indicative of a running average of said voltage in said multiplexer.

14. The wireless power supply of claim 12 wherein said switching circuit includes a high-side switch controlled by a high-side switch drive signal, and
wherein said timing of said multiplexer is controlled by said high-side switch drive signal such that said output signal includes said buffer copy when said high-side switch drive signal is high and includes said inverted buffer copy when said high-side switch drive signal is low, wherein said high-side switch drive signal is indicative of said voltage in said tank circuit.

\* \* \* \* \*